(12) United States Patent
Dunko

(10) Patent No.: US 8,116,679 B2
(45) Date of Patent: Feb. 14, 2012

(54) WLAN CONNECTION FACILITATED VIA NEAR FIELD COMMUNICATION

(75) Inventor: Gregory A. Dunko, Cary, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 694 days.

(21) Appl. No.: 12/210,809

(22) Filed: Sep. 15, 2008

(65) Prior Publication Data

US 2010/0068997 A1   Mar. 18, 2010

(51) Int. Cl.
*H04B 5/00* (2006.01)
(52) U.S. Cl. ...................... 455/41.1; 455/41.2
(58) Field of Classification Search .......... 455/41.1, 455/41.2
See application file for complete search history.

(56) References Cited

U.S. PATENT DOCUMENTS

| | | | |
|---|---|---|---|
| 2007/0079113 A1 | 4/2007 | Kulkarni et al. | |
| 2007/0190939 A1* | 8/2007 | Abel | 455/41.2 |
| 2008/0039212 A1* | 2/2008 | Ahlgren et al. | 463/46 |
| 2009/0327713 A1* | 12/2009 | Marin et al. | 713/168 |

OTHER PUBLICATIONS

International Search Report dated Oct. 2, 2009 issued in corresponding PCT application No. PCT/US2009/043910, 12 pages.
International Preliminary Report on Patentability dated Dec. 17, 2010 issued in corresponding PCT application No. PCT/US2009/043910, 11 pages.

* cited by examiner

*Primary Examiner* — Tuan H Nguyen
(74) *Attorney, Agent, or Firm* — Snyder, Clark, Lesch & Chung, LLP

(57) ABSTRACT

A near field communication (NFC) device is utilized in a mobile communications device to facilitate sensing the presence of and connecting to a wireless local area network (WLAN). A user can position the mobile communications device in close proximity to a designated location of a WLAN establishment at which an NFC device is situated. Near field communication is then detected and WLAN data can then be communicated by near field communication to the NFC reader in the mobile communications device. The NFC reader is coupled to a controller of the mobile communications device to input data received by the NFC device to the controller for processing. The data are utilized to facilitate connection to the WLAN.

20 Claims, 3 Drawing Sheets

WLAN CONNECTION FACILITATED VIA NEAR FIELD COMMUNICATION

BACKGROUND

The present invention relates to mobile communications, more particularly to communication via wireless local area networks.

Wireless communication devices, such as cellular phones, laptop computers, pagers, personal communication systems (PCS), personal digital assistants (PDA), and the like, provide advantages of ubiquitous communication without geographic or time constraints, as well as the added security of being able to contact help in the event of an emergency. These devices provide the convenience of a handheld communication device that is capable of increased functionality. An expanding variety of additional features have become available, for example, short or multimedia messaging, multimedia playback, electronic mail, audio-video capturing, interactive gaming, data manipulation, web browsing, and the like. Other enhancements, such as, location-awareness features, e.g., global position system (GPS) tracking, enable mobile communication devices to monitor their position and display present location.

Various alternative wireless connection options have become available. One such option is connection to a wireless local area network (WLAN). Such connection provides access to the Internet and other networks. Typically, the communication device continuously searches for available wireless networks, thus consuming battery charge. A periodic searching alternative, although somewhat more energy conservative, is still wasteful. A need thus exists for a more energy efficient alternative for locating available wireless networks.

Upon identification of an available network, either a new network or a previously visited network, wireless connection of the mobile communication device thereto requires loading profile information for the network into the device and user interaction. Such process is cumbersome and time consuming. A need thus exists for an improved alternative for establishing connection to a wireless local area network.

DISCLOSURE

The above described needs are fulfilled, at least in part, by employing a near field communication (NFC) device to facilitate learning about the presence of and subsequent connection to a wireless local area network (WLAN) in the proximity of a mobile communications device. NFC is a known short range, high frequency, wireless communication technology that enables the exchange of data between devices over small distances.

The mobile communications device, which may be embodied as a cellular phone, laptop computer, pager, personal communication system (PCS), personal digital assistant (PDA), or the like, contains an NFC device. The NFC device is coupled to a controller of the mobile communications device to input data received by the NFC device to the controller for processing. A user can position the mobile communications device in close proximity to an NFC tag in a designated location of a WLAN establishment. Near field communication is then established and information about the available WLAN network can then be communicated by near field communication to the NFC reader in the mobile communications device. The mobile communications device, therefore, need not continuously search for WLAN presence.

Information for connecting wirelessly to the WLAN is automatically collected by the controller from the received NFC data. The mobile communication device is then configured for connection to the WLAN in accordance with the collected information. The collected information may include, for example, WLAN network identity, WLAN service provider information and wired equivalent privacy (WEP) code information. The controller can determine whether the device is a subscriber to the WLAN service provider and configure the device accordingly. Connection to the network can be established by automatically transmitting user login information. For example, memory of the mobile communications device may contain one or more macros to access the necessary login data and transmit such data appropriately pursuant the controller. The macro operation can implement a response to a prompt received from the WLAN. One of the macros can implement startup of a virtual private network (VPN).

If the controller determines from the collected data that the mobile communications device is not a subscriber of the WLAN service provider, a command may be issued to enter a manual search mode for a subscribed service provider.

Still other aspects, features, and advantages will be readily apparent to those skilled in this art from the following detailed description, wherein preferred embodiments of the invention are shown and described, simply by way of illustration of the best mode contemplated. The invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

The present invention is illustrated by way of example, and not by way of limitation, in the figures of the accompanying drawing and in which like reference numerals refer to similar elements and in which.

DETAILED DESCRIPTION

In the following description, for the purposes of explanation, numerous specific details are set forth in order to provide a thorough understanding of exemplary embodiments. It should be apparent, however, that exemplary embodiments may be practiced without these specific details or with an equivalent arrangement. In other instances, well-known structures and devices are shown in block diagram form in order to avoid unnecessarily obscuring exemplary embodiments.

Figure 1:
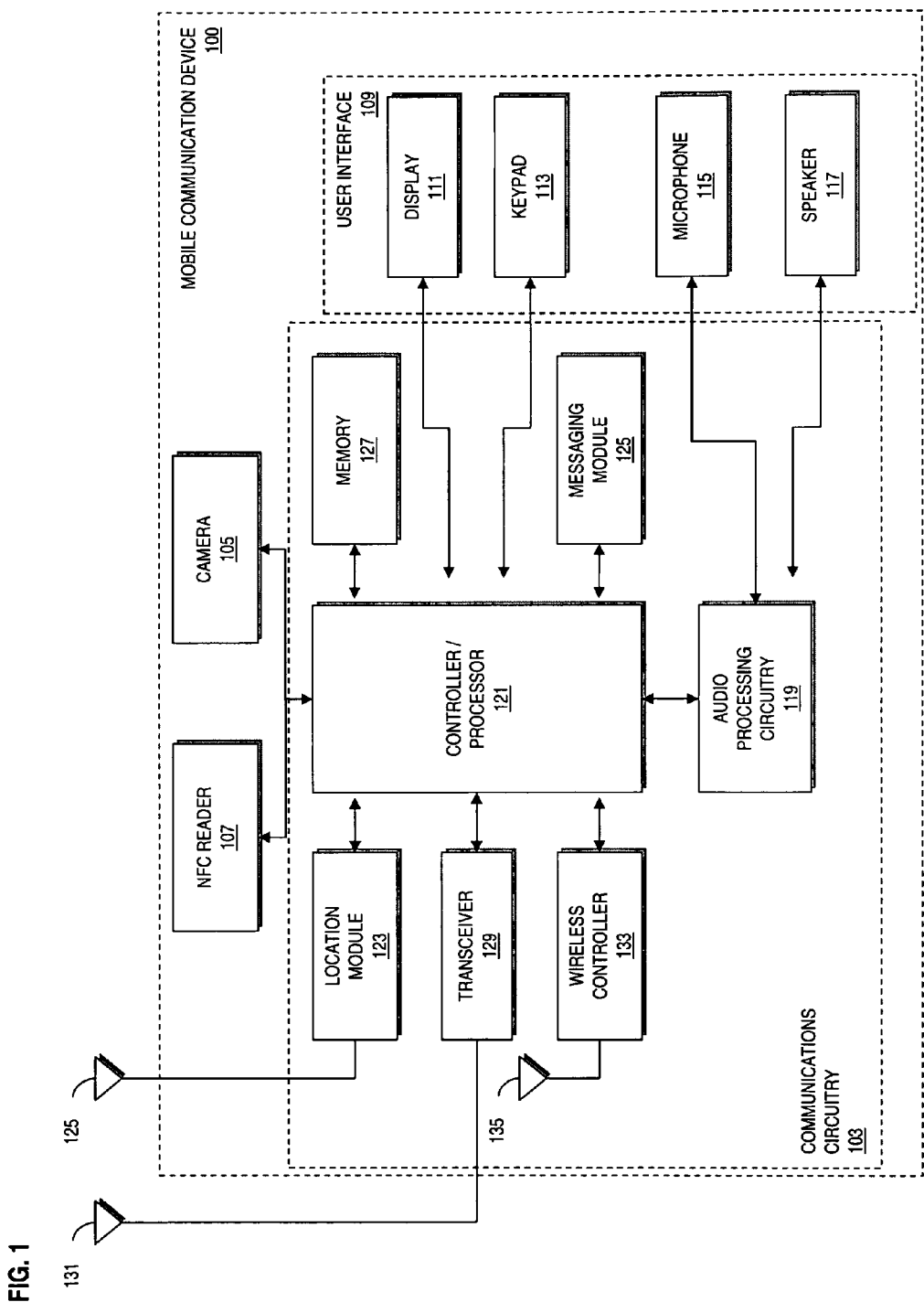
FIG. 1 is a block diagram of an exemplary mobile communication device.

FIG. 1 is a block diagram of an exemplary mobile communications device 100, such as a cellular phone, laptop computer, or the like. User interface 109 includes display 111, keypad 113, microphone 115, and speaker 117. Display 111 provides a graphical interface that permits a user of mobile communication device 100 to view call status, configurable features, contact information, dialed digits, directory addresses, menu options, operating states, time, and other service information, such as physical configuration policies associating triggering events to physical configurations for automatically modifying a physical configuration of mobile communication device 100. Keypad 113 is representative of conventional input mechanisms, which may also include a joystick, button controls, dials, etc. The graphical interface may include icons and menus, as well as other text, soft controls, symbols, and widgets. Display 111 enables users to perceive and interact with the various features of mobile communication device 100.

Microphone 115 converts spoken utterances of a user into electronic audio signals. Speaker 117 converts audio signals into audible sounds. Microphone 115 and speaker 117 may operate as parts of a voice (or speech) recognition system. Display 111 and speaker 117 can reproduce media content receive by the device from the host server.

Communications circuitry 103 enables mobile communication device 100 to initiate, receive, process, and terminate various forms of communications, such as voice communications (e.g., phone calls), SMS messages (e.g., text and picture messages), and MMS messages. In other instances, communications circuitry 103 enables mobile communication device 100 to transmit, receive, and process data, such as image files, video files, audio files, ringbacks, ringtones, streaming audio, streaming video, etc. Communications circuitry 103 includes audio processing circuitry 119, controller (or processor) 121, location module 123 coupled to antenna 125, memory 127, transceiver 129 coupled to antenna 131, and wireless controller 133 (e.g., a short range transceiver) coupled to antenna 135. Controller 121 is also coupled to messaging module 125.

Specific design and implementation of communications circuitry 103 can be dependent upon one or more communication networks for which mobile communication device 100 is intended to operate. For example, mobile communication device 100 may be configured for operation within any suitable wireless network utilizing, for instance, an electromagnetic (e.g., radio frequency, optical, and infrared) and/or acoustic transfer medium. In various embodiments, mobile communication device 100 (i.e., communications circuitry 103) may be configured for operation within any of a variety of data and/or voice networks, such as advanced mobile phone service (AMPS) networks, code division multiple access (CDMA) networks, general packet radio service (GPRS) networks, global system for mobile communications (GSM) networks, internet protocol multimedia subsystem (IMT) networks, personal communications service (PCS) networks, time division multiple access (TDMA) networks, universal mobile telecommunications system (UTMS) networks, or a combination thereof. Other types of data and voice networks (both separate and integrated) are also contemplated, such as microwave access (MiMAX) networks, wireless fidelity (WiFi) networks, satellite networks, and the like. Also coupled to controller 121 are NFC reader 107 and camera 105. Camera 105 can capture digital images and/or movies. Image and video files corresponding to the captured pictures and/or movies may be stored to memory 127.

Figure 2:
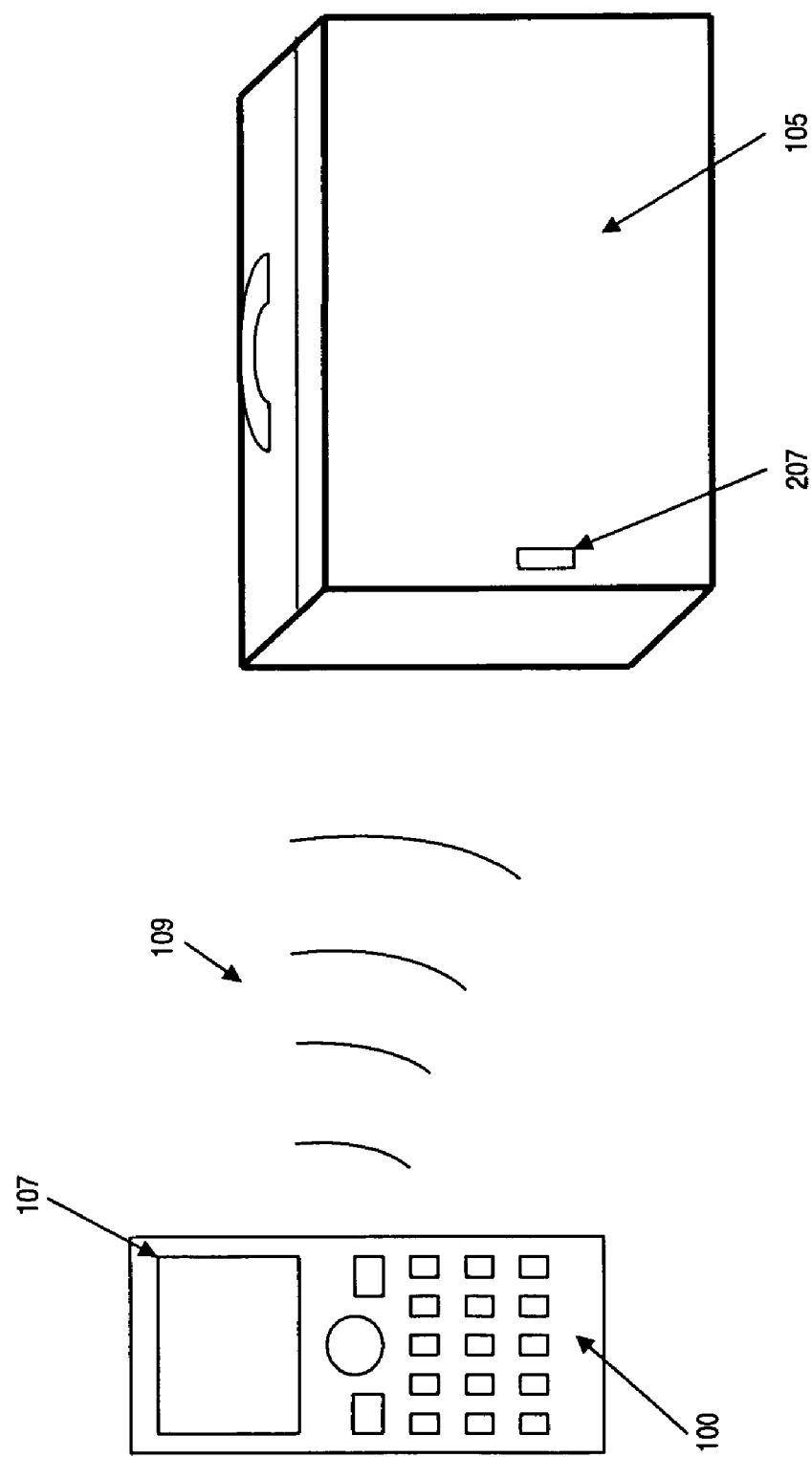
FIG. 2 is an exemplary schematic illustration of near field communication between a mobile communication device and a WLAN establishment location.

FIG. 2 is an exemplary schematic illustration of near field communication between a mobile communication device 100 and a WLAN establishment location 105, represented by a cabinet that contains NFC tag 207. The cabinet may be located, for example, at the entrance of the WLAN establishment. The mobile communication device 100 is exemplified in this instance as a cellular telephone. NFC tag 207 is contained within phone 100.

NFC technology, as well-known to those skilled in the art, combines the functions of a contactless reader, a contactless card, and peer-to-peer communication. Operating at 13.56 MHz, NFC technology is defined in the ISO 18092 and ISO (International Organization for Standardization) 21481, ECMA (340, 352 and 356) (European association for standardizing information and communication systems) and ETSI TS102 190 standards. When a device bearing an NFC reader is within range of a second device bearing an NFC tag, the device bearing the reader can obtain information in the tag and implement programmed action. NFC is thus a short-range wireless communication system enabled by positioning two NFC-enabled devices within a range of, for example, 1-10 centimeters of each other.

A user of the mobile phone 100, upon entering the WLAN establishment can swipe the phone in the proximate vicinity of the NFC tag 207 of cabinet 105, thereby implementing NFC signal communication 109 between the phone 100 and the NFC tag 207. Local WLAN parameters are provided to the mobile device. The mobile device uses these parameters to configure operation for connection to the local network. If the WLAN is a service provider for which the device user has a subscription, the user's device username/password information is automatically entered and the connection is automatically established.

Figure 3:
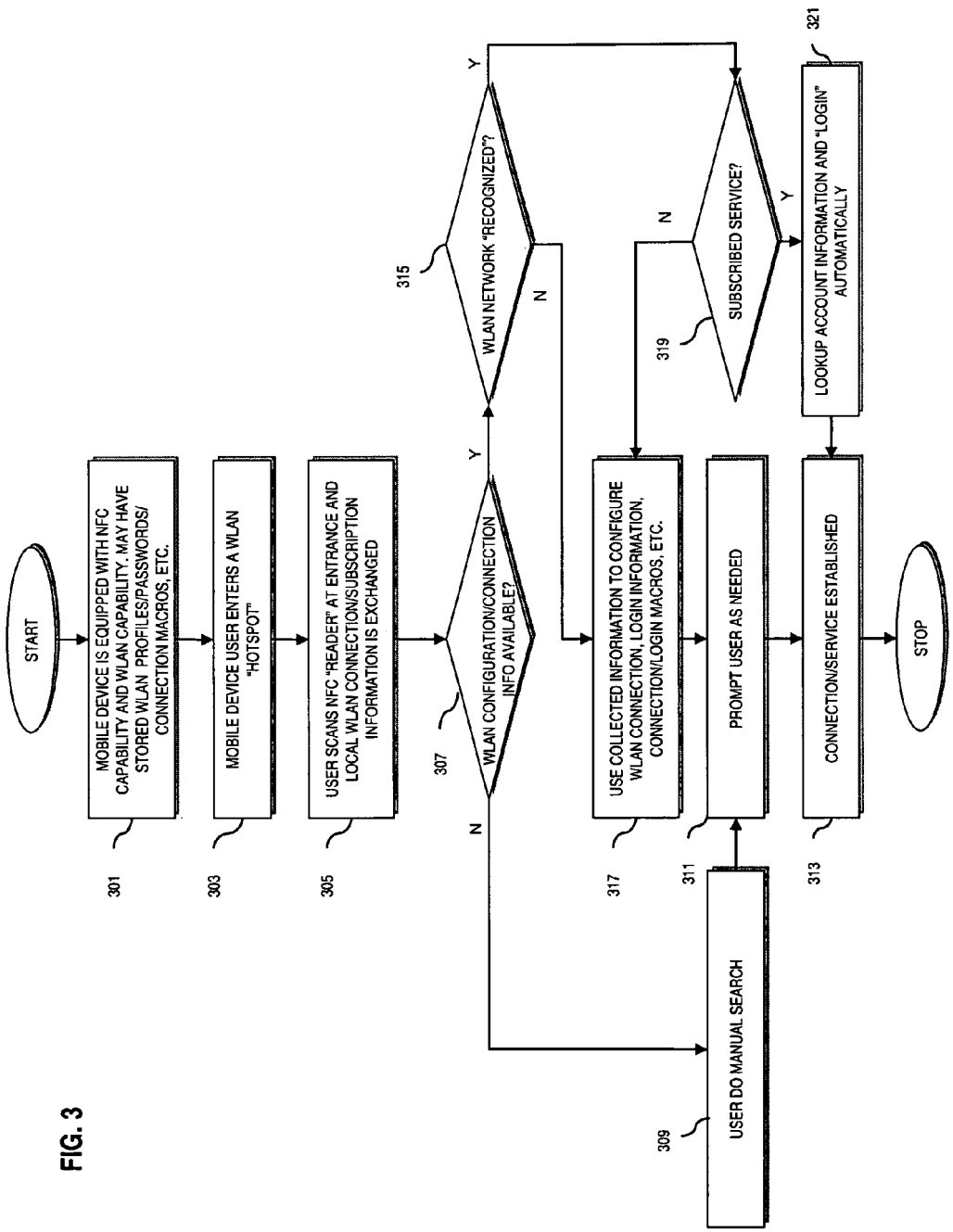
FIG. 3 is a flow chart of WLAN identification and connection operation.

Operation is more fully explained with reference to the flow chart of FIG. 3. As represented by block 301, the wireless communication device 100 is equipped with WLAN capability as well as NFC capability. WLAN profiles, passwords and subscription information to one or more particular service providers may be stored in memory 127. Also stored therein may be connection macros that facilitate the connection establishment. As an example, some WLAN sites require a user to launch a browser to reach a "terms of acceptance" page. Once accepted, the port is opened and access to the internet is provided. For users who desire a virtual private network (VPN) connection, the macro may include VPN connection startup.

The communication device 100 is not actively searching for WLAN connection and is not expending battery charge for such operation. At step 303, the user enters a "hotspot" WLAN establishment 105 and scans NFC tag 207 with the mobile device at step 305. Information about the WLAN ID as well as WLAN configuration WEP codes, WLAN service provider, etc., is provided to the mobile device. At step 307, determination is made as to whether sufficient WLAN configuration and connection information is available. If insufficient information exists, the user may initiate a manual search at step 309. The user is then prompted as needed at step 311 and connection to the service is established at step 313.

If sufficient configuration and connection information has been determined at step 307, determination is then made at step 315 of whether the WLAN network is recognized by the mobile device 100. For example, the user may have been connected with the network in a previous communication or may be a subscriber to the service provider. If the WLAN network is not recognized at step 315, the information collected at step 305 is used by the mobile device to configure WLAN connection, login information, macros, etc., at step 317. The process flow then continues to step 311.

If the WLAN network is recognized by the mobile device 100 at step 315, then determination is made at step 319 of whether the user is a subscriber to the service provider. If so, account information stored in memory 127 is accessed and controller 121 initiates automatic login to the network at step 321. If it is determined at step 315 that there is no subscription to the WLAN service provider, the flow reverts to step 317 thereafter to use the collected information to respond to prompts for connection at steps 311 and 313.

Among the advantages of the present disclosure is that NFC capability in a WLAN capable communications device may be utilized to collect network and connection information to facilitate establishment of WLAN connection and service. In this disclosure there are shown and described only preferred embodiments of the invention and but a few examples of its versatility. It is to be understood that the invention is capable of use in various other combinations and environments and is capable of changes or modifications within the scope of the inventive concept as expressed herein.

What is claimed is:

1. A method of operating a mobile communication device, comprising:
    sensing the presence of a wireless local area network (WLAN) by detecting a near field communication transmission;
    automatically collecting information for connecting wirelessly to the WLAN based on the sensing; and
    configuring the mobile communication device for connection to the WLAN based on the information collected, wherein the configuring comprises:
        determining whether the mobile communication device is subscribed to a WLAN service provider;
        connecting to the WLAN, when based on the determining, the mobile communication device is subscribed to the WLAN service provider; and
        conducting a search for a subscribed service provider based on a user input, when based on the determining, the mobile communication device is not subscribed to the WLAN service provider.

2. The method as recited in claim 1, further comprising:
    initiating a wireless communication connection between the mobile communication device and the WLAN.

3. The method as recited in claim 1, wherein the detecting comprises detecting by a near field communication device, coupled to the mobile communication device when the mobile communication device is in close proximity to a location of a near field communication tag.

4. The method as recited in claim 1, wherein the collecting comprises obtaining WLAN configuration information from the near field communication transmission.

5. The method as recited in claim 1, wherein the collecting comprises obtaining the WLAN network identity from the near field communication transmission.

6. The method as recited in claim 1, wherein the collecting comprises obtaining wired equivalent privacy (WEP) code information from the near field communication transmission.

7. The method as recited in claim 1, wherein the collecting comprises obtaining WLAN service provider information from the near field communication transmission.

8. The method as recited in claim 1, further comprising storing one or more macros that facilitate a wireless connection with the WLAN.

9. The method as recited in claim 8, wherein one of the one or more macros can implement a response to a prompt received from the WLAN or one of the one or more macros can implement a startup of a virtual private network (VPN).

10. The method as recited in claim 1, wherein the configuring comprises modifying a parameter of the mobile communication device.

11. A method of operating a mobile communication device, comprising:
    sensing the presence of a wireless local area network (WLAN) in an establishment by detecting a near field communication transmission (NFC);
    in response to the sensing step, automatically collecting information for connecting wirelessly to the WLAN; and
    configuring the mobile communication device for connection to the WLAN in accordance with information obtained in the collecting step, wherein the step of configuring comprises determining that the mobile communications device is not a subscriber of the WLAN service provider and, in response thereto, conducting a manual search for a subscribed service provider.

12. A non-transitory computer-readable medium comprising instructions for:
    sensing a presence of a wireless local area network;
    collecting information for wirelessly connecting to the wireless local area network; and
    configuring a mobile communication device to connect to the wireless local area network based on information collected, wherein the configuring comprises;
        determining whether a user of the mobile communication device is a subscriber to the wireless local area network;
        transmitting user login information when the user of the mobile communication device is the subscriber to the wireless local area network; and
        searching for a service provider when the user of the mobile communication device is not the subscriber to the wireless local area network.

13. A mobile device comprising:
    a controller;
    a wireless communication interface coupled to the controller; and
    a near field communication device coupled to the controller; wherein the controller is configured to:
        sense the presence of a wireless local area network (WLAN) based on near field communication device information;
        automatically collect information for connecting wirelessly to the WLAN based on the sensing; and
        configure the mobile device for connection to the WLAN based on the information collected, wherein the configuring comprises:
            determine whether the mobile device is subscribed to a WLAN service provider; and
            conduct a search for a service provider when the mobile device is not subscribed to the WLAN service provider.

14. The mobile device as recited in claim 13, wherein when transmitting, the controller is configured to access user login information stored in a memory corresponding to a subscription associated with the WLAN service provider.

15. The mobile device as recited in claim 14, wherein the the user login information includes username and password information.

16. The mobile device as recited in claim 13, wherein when conducting, the controller is further configured to prompt a user of the mobile device.

17. The mobile device as recited in claim 13, further comprising a memory for storing one or more macros that facilitate wireless connection to the WLAN.

18. The mobile device as recited in claim 17, wherein one of the one or more macros can implement a response to a prompt received from the WLAN and one of the one or more macros can launch a browser.

19. The mobile device as recited in claim 17, wherein one of the one or more macros can implement a startup of a virtual private network (VPN).

20. The mobile device as recited in claim 13, wherein when configuring, the controller is further configured to:
    provide user login information when the mobile device is subscribed to the WLAN service provider.

* * * * *